Oct. 6, 1942.    M. H. LOUGHNANE    2,297,837
TESTING APPARATUS
Filed Feb. 8, 1941    3 Sheets-Sheet 1
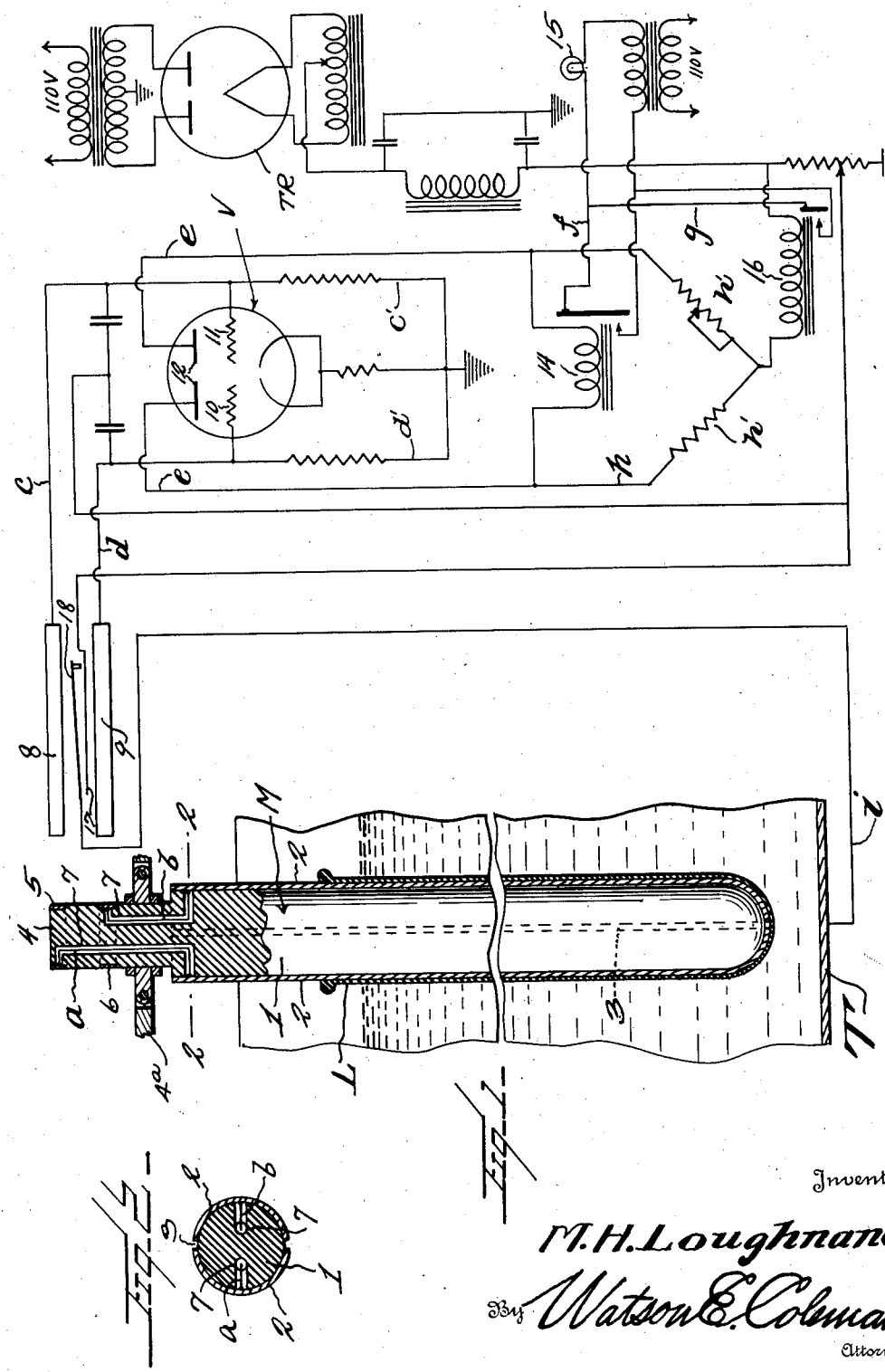
Inventor
M. H. Loughnane
By Watson E. Coleman
Attorney

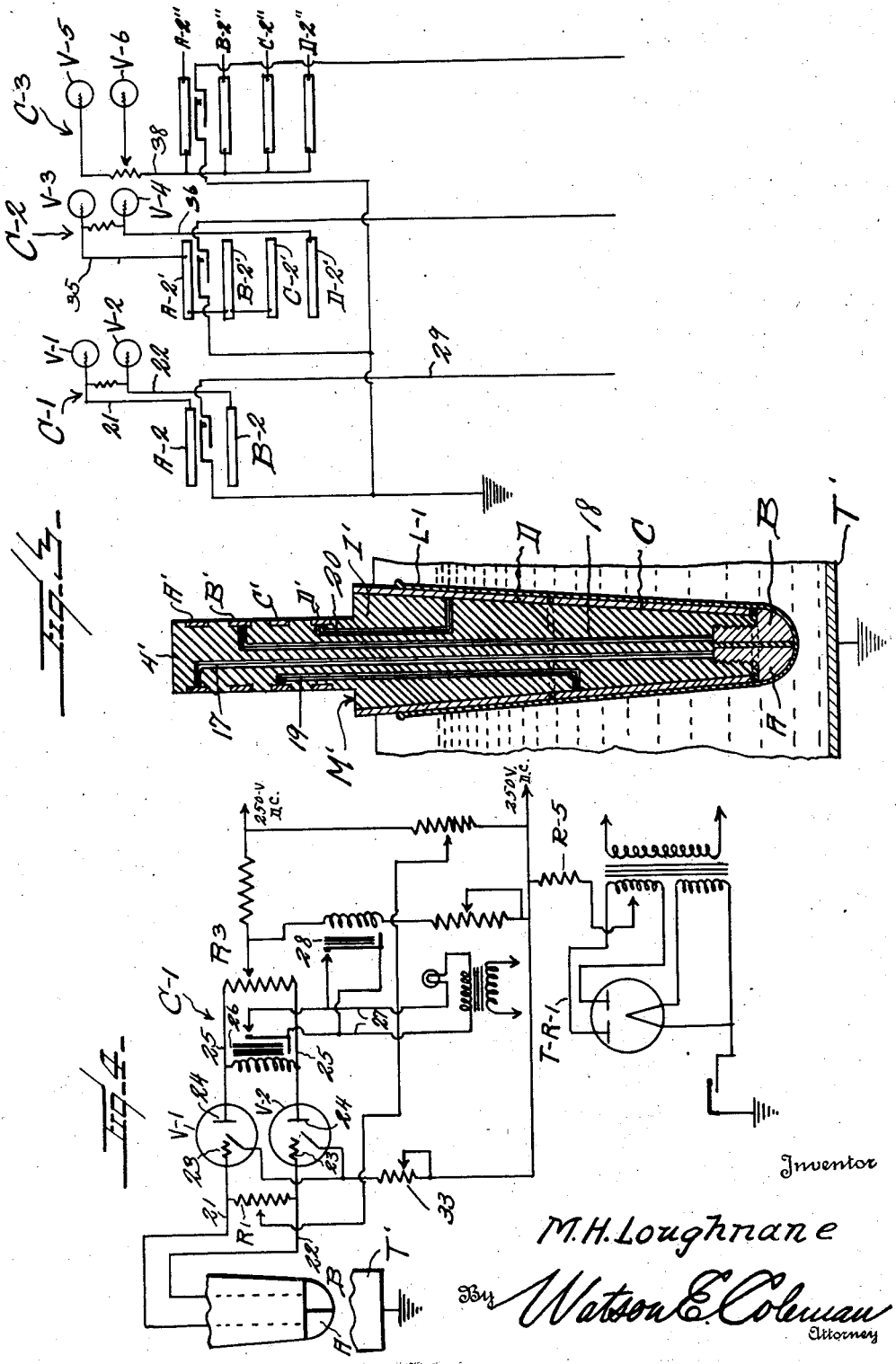

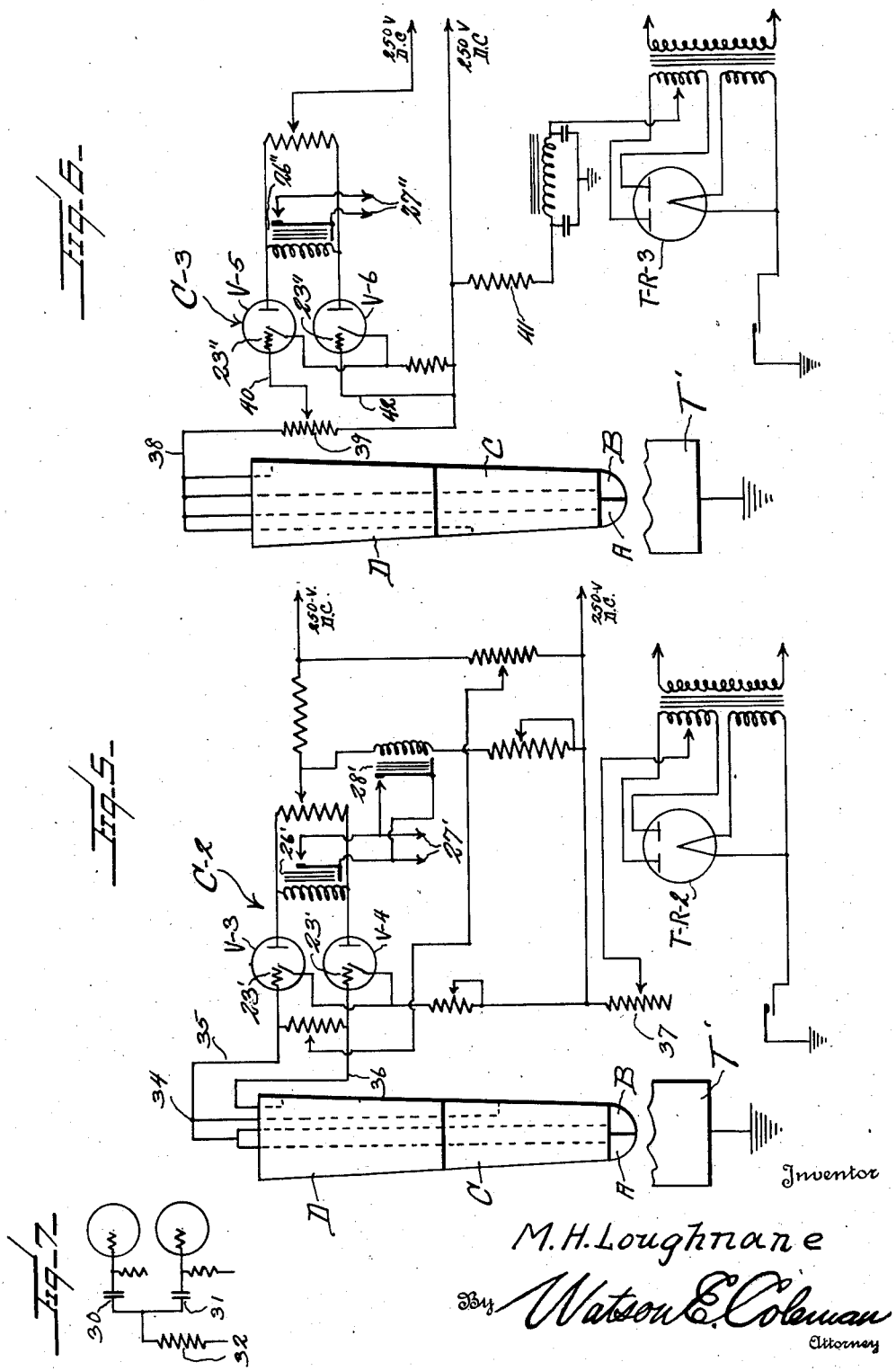

Patented Oct. 6, 1942

2,297,837

UNITED STATES PATENT OFFICE 2,297,837

TESTING APPARATUS

Michael Henry Loughnane, Ventnor, N. J., assignor of one-half to Julius Schmid, Inc., New York, N. Y., a corporation of New York Application February 8, 1941, Serial No. 378,073

10 Claims. (Cl. 175—183)

This invention relates generally to improvements in electrical testing apparatus and has for its primary object to provide improved apparatus for testing material having dielectric characteristics and more particularly for testing thin articles of latex or rubber cement film for the purpose of determining if such articles are free of objectionable features and measure up to a desired standard.

The subject matter of my prior application, Ser. No. 270,675, filed April 28, 1939, and allowed August 14, 1940, is set forth and forms a part of the present application.

Another object of the invention is to provide an electrical testing apparatus for articles of the character described having associated therewith or making use of a Wheatstone bridge circuit wherein the circuit is maintained in a balanced condition when the material under test conforms with or meets required standards but becomes unbalanced in the event that the material under test fails in any one of a number of respects to meet said standards and effects the operation of a suitable signal or reject mechanism.

A further object of the invention is to provide a testing apparatus of the character stated for testing material, such as latex, to detect the material which may be porous or perforated or wherein the degree of porosity determines the operation of the testing machine, for the purpose of detecting and removing the perforated or too porous material from unperforated material or material having a non-objectionable degree of porosity.

A still further object of the invention is to provide an electrical testing mechanism for thin rubber cement film articles which is designed to pass such articles through a series of testing stages for the purpose of detecting power factor changes in the testing circuit as a result of distortion in the film due to differences in the texture thereof and for detecting any differences in the texture thickness, conductivity, dielectric strength, elasticity, etc.

Still another object of the invention is to provide an electrical testing circuit which may be employed as a power factor check of like capacities for condensers and as a power factor, capacity and resistance check as applied principally in the testing of thin rubber cement films.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a diagrammatic view with portions partly in section and partly in elevation illustrating a testing apparatus constructed in accordance with an embodiment of my invention.

Fig. 2 is a sectional view taken substantially on the line 2—2 of Fig. 1.

Fig. 3 is a view illustrating another embodiment of the mandrel and illustrating the means of coupling the several testing circuits therewith.

Fig. 4 illustrates one testing circuit in connection with which the mandrel of Fig. 3 operates.

Fig. 5 illustrates the second circuit in connection with which the mandrel of Fig. 3 operates.

Fig. 6 illustrates the third testing circuit in connection with which the mandrel of Fig. 3 operates.

Fig. 7 is a circuit illustrating the theory of operation of the invention.

In the accompanying drawings reference will first be had to and a description given of the form of the invention set forth in the prior application previously referred to wherein in Fig. 1, T denotes a tank of current conducting material which is adapted to contain a supply of water at room temperature, into which the article to be tested is introduced. A mandrel M is provided which is adapted to move through the tank through a desired period of time and upon which mandrel is placed the article or material L, which is to be tested, such as latex, such test being made in material of this character for porosity above a predetermined or desired degree or for perforations which would render the material unsuitable for use.

The mandrel M comprises a core 1 of fibre or other suitable material which is non-conductive of electricity and which is water-proof. This mandrel is enclosed in and has secured thereto the metallic sheaths 2 which extend each substantially half-way around the mandrel and over the lower rounded end thereof but which are spaced apart at their adjacent edges to provide an insulating area 3 or, if desired, such adjacent edges of the sheaths may be separated by a suitable interposed thin strip of insulation material. Thus it will be seen that the sheaths 2 form substantially a complete covering for the insulation body over the length thereof and across the rounded lower end.

The mounting of the mandrel M may be of any suitable character and is of no particular importance in the present case other than that the upper end thereof shall be provided with a stem 4 or other means for effecting its attachment to a suitable endless carrier 4ª and such stem is provided with contact members 5 and 6 here shown as being in the form of encircling bands.

The contact 5 has electrical connection with one of the sheaths 2 by the conductor $a$ while the second contact 6 has electrical connection with the other sheath 2 through the conductor $b$. In the construction illustrated the conductors $a$—$b$ are extended through passageways 7 in the stem 4 of the mandrel core, but it will be obvious that any other means may be employed for electrically connecting the contacts with the sheaths.

Mounted adjacent the path of travel of the mandrel M are two contact wiper plates which are arranged to be engaged by the contact members 5 and 6 just before the mandrel reaches a position in the tank where it begins to move upwardly and outwardly therefrom. These wiping contact plates 8 and 9 are stationary and they have leading respectively therefrom conductors $c$ and $d$ which electrically connect such plates with the grids 10 and 11, each of which forms a part of the valve V which is coupled in the Wheatstone bridge. In this valve in association with the grids are plates 12 with which are connected conductors $e$ forming a part of the bridge and across which is connected a relay 14. The valve also includes the usual double cathode as shown, which is electrically connected with the conductors $c$—$d$ by the conductor $c'$—$d'$.

The two conductors $e$ lead through resistances $h'$ by way of the conductor $h$ to an end of a second relay 16.

When the circuit of the bridge is balanced or the current flow through the conductors $e$ is equal, the relay 14 remains open, but when the current flow through these conductors is unbalanced, this relay becomes closed to effect the closing of a signaling or throw-out circuit $f$ in which is coupled a signaling element 15 or other mechanism suitable for indicating the presence of an unsatisfactory article on the mandrel M. This element 15 is here illustrated as a signaling lamp although it may, if desired, be, as stated, in the form of a throw-off mechanism for effecting the mechanical removal of the material on the mandrel M. Such throw-off, however, forms no part of the present invention and a detailed description and illustration of the same are, therefore, believed to be unnecessary.

The second-mentioned relay 16 is in the supply circuit for the Wheatstone bridge and has electrical connection through the conductors $g$ with the circuit $f$ and, of course, as shown, this relay is in electrical connection through the conductors $h$ and $e$ with the vacuum tube or valve plates 12, so as to be operated only by total voltage flow through the conductors $c$ and $d$.

It will be apparent that the relay 14 can operate from either of the plates 12 whereas the relay 16 can only operate by the combined functioning of the two plates.

The tank T has in electrical connection therewith a current feed conductor $i$. This conductor is electrically connected with the bridge circuit through the coil winding of the relay 16 and receives its current supply from the transformer rectifier unit TR as shown.

Interposed in the current supply line or conductor $i$ is a normally open switch consisting of the relatively movable contacts 17 and 18. This switch is positioned with respect to the plates 8 and 9 and adjacent the path of movement of the upper end of the mandrel M so that the contacts of the switch will be closed by engagement by a portion of the mandrel, as for example, the stem 4, after the contacts 5 and 6 have come into engagement with the plates 8 and 9, and the switch is so constructed that it will be released by the mandrel and be opened before the contacts 5 and 6 disengage the plates 8 and 9. This arrangement is provided so as to assure simultaneous electrical connection of both of the sheaths 2 as well as simultaneous release or electrical disconnection of such sheaths to prevent a possible unbalancing of the current flow through the conductors $c$ and $d$.

In the operation of this testing mechanism, the material L for testing is placed on the mandrel M and as the material and mandrel enter the water in the tank T, there will be no functioning of the apparatus if the latex is free of holes or is not sufficiently porous to permit moisture to pass through to either sheath after the material has been in the water for a predetermined period. However, if there is an opening in the material, the fluid will pass through and form a path for completion of current flow from the line $i$ to one or the other or both sheaths, and when the contacts 5 and 6 come into engagement with the wiper plates 8 and 9, current will flow through one or the other of the conductors $c$, $d$, thus resulting in the unbalancing of the circuit which will cause the relay 14 to function to close the circuit $f$ so as to make operative the signaling or throw-off element with which this circuit is connected.

While in connection with the testing of latex material the test is particularly desirable for detecting perforations, it is also of advantage to test such material to determine whether or not it is up to standard as to porosity. In the practice of the invention, the mandrel M with the material L thereon remains in the water a sufficient time to allow some degree of seepage through the material, if such material is below the required standard of porosity. As the water passes through the material and contacts the sheaths 2, the same result will be obtained as if the perforation were present, and if the porosity extends around the material, the water contact will be with both of the sheaths, resulting in current passing through both conductors $c$ and $d$ in equal volume, thus energizing the second relay 16 to make the same operative for closing the operating circuit in which the throw-off or indicating unit is connected.

In Figs. 3 to 6 there is illustrated an improvement or refinement of the apparatus as disclosed in Figs. 1 and 2 for making progressive tests of rubber cement film articles for checking such article over various areas for undesirable features which might make the same undesirable for use or sale such, for example, as variations in thickness, which would affect the strength of the material, the presence of blisters or unduly thickened portions, the inclusion of foreign material in the film such as lint or other matter or for the presence of holes.

In Fig. 3 there is illustrated an article carrying mandrel M—1, together with the means by which the contacts carried by the mandrel are coupled with the testing circuits which are particularly illustrated in Figs. 4 to 6 inclusive, and are identified as C—1, C—2, and C—3. The mandrel M—1 supports the rubber cement film article L—1, this mandrel consisting of a core 1' of suitable insulation material. The core is provided with a stem 4' for the purpose hereinafter stated. The lower end of the mandrel is in the form of a hemisphere which is divided axially into the portions $a$ and $b$ which are of current conducting material and which are electrically separated from one another, and encircling the lower half of the core is a metallic or current conducting sheath C which is electrically insulated from the halves A and B of the hemispherical tip while the upper half of the core is encased in the sleeve D which is electrically insulated from the lower sleeve half C. Thus the mandrel is divided into four areas formed of current conducting material and electrically insulated from one another.

The stem 4' carries four contacts which are here illustrated as being in the form of annular bands which are identified by the characters A', B', C' and D', and the contact A' is electrically connected by a current conductor 17 with the tip portion A while the contact B' is connected with the tip portion B by the conductor 18, and the contacts C' and D' are respectively coupled with the sheaths C and D by the conductors 19 and 20.

The character T' designates the water tank or receptacle through which the mandrel carrying the article L—1 passes with the major portion of the article submerged in the water in the tank as shown. In making the successive steps for testing the article L—1 at the top, which is the closed end which covers the hemispherical tip portions A and B, the circuit C—1 is employed and the mandrel as it moves through the tank has the contacts A', B' brought into electrical engagement with wiper terminals A—2, B—2, which are respectively electrically coupled by the conductors 21 and 22 with the grids 23 of the triode tubes V—1, V—2. These tubes are shown as being connected on opposite sides of a Wheatstone bridge circuit and the plates 24 of the tubes are connected by conductors 25 with the variable resistance R—3. Bridging the conductors 25 is a relay 26 which controls a circuit, not shown, with which it is connected by the conductors 27, in which circuit is connected a signaling or throw-off mechanism in an arrangement similar to that shown in Fig. 1.

A variable resistance R—1 extends across or connects the conductors 21 and 22 which lead to the tubes.

A second relay 28 is connected in a second bridge circuit, one leg of which comprises the pair of tubes V—1, V—2, while the other leg comprises the variable resistance R—4.

A transformer and rectifier unit TR—1 supplies the necessary pulsating D. C. voltage for the tank, this unit bridge being coupled with the circuits through the resistance R—5 and supplying current to the tank by the current conducting line 29. A variable resistance R—2 regulates the current supply for the cathodes of the vacuum tubes. This line may be provided with a switch unit to be closed by the mandrel or in some other suitable manner after the contacts A'—B' have engaged the plates A—2, B—2 and opened after these contacts have been broken.

The resistance value of R—5 is equal to the total dielectric value of the portions of the film covering the parts A and B of the mandrel.

Fig. 7 illustrates the theory of the operation of the test made upon the top of the film article which is carried on the mandrel M—1 for any imperfections which have the effect of changing the value of the plate currents of V—1 and V—2, such test being made for appearance particularly as well as for strength of the material. In this circuit of Fig. 7 there are shown two condensers 30 and 31 in series across the grids of two vacuum tubes and midway between the condensers is connected a resistor 32. It is an established fact that the voltage across a condenser is 90° out of phase with the voltage in series with it. In the arrangement shown in Fig. 7 there is a voltage through condenser 30 and yet this carries the voltage across the condenser 31. The reverse is also true in that condenser 31 carries the voltage that is across condenser 30 and also has through it the supply voltage from the resistance 32. If the power factors of condenser 30 and condenser 32 are identical and the tubes following are in a previously balanced bridge circuit, the voltages on the grids of the tubes will be of like phase but not necessarily of the same phase as appears across resistance 32.

In the circuit C—1 it will be seen that the divided or split hemi-spherical top of the mandrel, made up of the bodies A and B, which is covered with the rubber cement film and immersed in the water in tank T', provides the same conditions as in the circuit of Fig. 7. The cathodes of tubes V—1 and V—2 are not by-passed and have a common cathode resistor 33. This is for the function of degeneration in the fact that a current rise in V—1 will produce a current drop in V—2 since the same bias is applied to both grids if the grid of V—1 is energized and that of V—2 is not.

With the foregoing facts in mind, the operation of the test circuit C—1 is as follows when the mandrel carrying the article L—1 enters the water of the tank T' and the circuit is closed after contacts A', B' have come into engagement with the plates A—2, B—2. A pulsating D. C. voltage is applied to the tank T' through the function of the transformer rectifier unit and if the top of the article contains any unsymmetrical spots such as blisters or thickened portions of the rubber film, this will create a change of power factor resulting in the voltages reaching the grids 23 through the lines 21 and 22 being out of phase, the degree of such outer phase condition of the voltages being determined by the amount of distortion or variation in the portions of the film covering the parts A and B of the mandrel. The phase angle across resistance 33 cannot then be the same as the phase angle on either grid of V—1 or V—2, therefore, the bridge which includes the vacuum tubes becomes unbalanced and causes operation of the relay 26.

In actual practice it has been found that marks, clots of rubber, dirt, blisters, lint or any foreign substances will affect the power factor and operate the relay. Obviously if the undesirable condition in the top of the article L—1 such as a blister or clot of rubber, bridges the insulation between the parts A and B, the voltage surged through the bridge may be balanced so as not to affect the relay 26, but in this case it will pass through the relay 28 to operate the latter and close the circuit connected with the lines 27 to effect the functioning of the indicator or throw-off device.

After the article carrying mandrel passes from contacts A—2, B—2, the contacts A', B', C' and D' carried by the neck 4' of the mandrel come into engagement with the four contact plates shown in Fig. 3 and indicated by the reference characters A—2', B—2', C—2' and D—2', which are coupled with the second test circuit C—2, and in which the three plates A—2', B—2' and C—2' are electrically coupled together, as indicated at 34, and are connected with the conductor 35 while the fourth plate D—2' is connected to the conductor 36. These conductors lead to a Wheatstone bridge circuit of the same character as is employed in circuit C—I wherein the vacuum tubes are designated by the characters V—3 and V—4, while the grids of the tubes to which the lines 35 and 36 run are designated by the characters 23'. The relay 26' connected in the second bridge controls a circuit coupled with the conductors 27' while a second relay 28' performs the same function as the relay 28 of circuit C—I. In this second circuit the transformer rectifier unit TR—2 supplies the necessary voltage to the tank and is connected with the Wheatstone bridge circuit through the variable resistance 37.

This test circuit C—2 responds more to capacitative and resistance changes rather than to voltage phase changes and is controlled by the lower resistance 37 and is a less sensitive circuit than circuit C—I.

In this hook-up of the elements A, B and C of the mandrel, the dielectric value of the material covering these elements is equal to the dielectric value of the material covering the portion D so that when an article of good grade is on the mandrel under test, the two sides of the bridge circuit involving the tubes V—3 and V—4 will remain balanced so that the relay 26' will not be operated. In the functioning of this circuit C—2, a pulsating D. C. current is employed.

After the mandrel carrying the article L—I passes from engagement with the contact plates coupled with the circuit C—2, it passes on to the third circuit C—3 where the four contacts carried by the neck of the mandrel engage another group of four contact plates associated with circuit C—3 and indicated as A—2", B—2", C—2" and D—2". This third circuit also employs the Wheatstone bridge arrangement with the two vacuum tubes V—5 and V—6, and it will be seen that all four of the contact plates with which the contacts carried by the neck of the mandrel engage, are electrically connected together by the conductor 38 having in circuit therewith the resistance 39 with which is adjustably connected a conductor 40 which leads to the grid 23" of vacuum tube V—5. In connection with the operation of this circuit there is employed pure D. C. voltage, the same being supplied by the unit TR—3 which is coupled with the tank in the manner illustrated and with the conductor 38 by the resistance 41. A single relay is employed which is indicated by the numeral 26" and is connected across the bridge as shown. The grid 23" of V—6 is connected with the conductor 38 by the conductor 42.

It will be seen that when the contacts of the mandrel are coupled with the circuit C—3, all four elements A, B, C and D of the mandrel are electrically joined together and a test is made of the material or article on the mandrel for any imperfection such as a hole or lint or other foreign matter which might cause rupture of the material or which will permit water to pass through the material. In other words, this test finds anything in the material which is conductive of water and if such a condition is found, effects the removal of the material from the mandrel as waste, as distinguished from tests made by circuits C—I and C—2 where the material may be removed as unsatisfactory but suitable for use as "seconds." The voltage value of the circuit C—3 is low preferably for testing for holes, but may be stepped up if desired, to test for lint or such water absorbing material as may be embedded in the body of the article. In the carrying out of this test, the article remains in the water for a sufficient period of time to permit the penetration or soaking through of the water by way of holes or water absorbing material and, consequently, if such passage of water does occur, then a direct passage of current from the tank to the conductor 38 will take place and effect such unbalancing of the Wheatstone bridge circuit as to bring about the operation of the relay 26".

In Figs. 1 and 4, a complete circuit lay-out is shown in connection with the relays, therefore, it is considered unnecessary to show such relay circuits in connection with the test circuits C—2 and C—3, it being understood that the conductors 27' and 27", test circuit C—3, are connected with an indicating or throw-off mechanism such as has been illustrated and described in connection with Fig. 1.

While there have been illustrated and described mandrels having spaced sheaths or spaced current conducting bodies mounted upon cores of insulation material, it is to be understood that this is intended to include any equivalent structure such, for example, as a mandrel comprising solid metallic sections separated by suitable insulation.

While in Fig. 3 there has been shown in connection with each of the groups of wiper plates a circuit closing switch similar to that shown in Fig. 1, whereby each test circuit may be closed by the mandrel after the contacts thereof have come into engagement with the wiper plates and opened after the contacts have disengaged from the wiper plates, it is, of course, to be understood that this is merely shown as one possible arrangement for turning on and off the current in a manner to prevent uneven current surges through the Wheatstone bridges and that other possible arrangements may be worked out and employed for producing this result.

It will be apparent from the foregoing that the method and apparatus set forth may be used with equal facility for testing latex and rubber cement film articles or other material having dielectric characteristics for the purpose of determining the presence of areas of dissimilar thicknesses or the presence of breaks or foreign substances in the material.

What is claimed is:

1. The method of testing a film of dielectric material, which comprises dividing the film into areas presumably having equal dielectric values, electrically coupling each of said areas with one leg of a Wheatstone bridge circuit in which the two legs are electrically balanced, applying a voltage to the other side of the film to create an electrical strain through the two areas, and employing any differences in dielectric strain between the two areas, resulting from physical differences between the two areas of the film, which would change the voltage in the bridge, to identify a below standard condition of the film.

2. The method of testing a film of dielectric material, which comprises placing the film between two oppositely charged bodies, one of which bodies is divided into two electrically separated parts, and coupling the parts of the one body in circuit with two sides of a Wheatstone bridge in which the said sides are electrically balanced to note any unbalance in the bridge or voltage change therein.

3. The method of testing hollow thin rubber bodies, which comprises contacting the inner surface of the hollow body with two adjacent electrically separated metal surfaces, electrically coupling said metal surfaces each in circuit with the two legs of a Wheatstone bridge in which the legs are electrically balanced, immersing that surface of the body opposite to the metal surfaces in a current conducting fluid bath, applying an electric potential through said bath to the second-mentioned surface to create an electrical strain in the body, and employing a voltage change or unbalance in the bridge for identification of a below standard body.

4. The method of testing hollow thin rubber bodies, which comprises contacting the inner surface of the hollow body with two adjacent electrically separated metal surfaces, electrically coupling said metal surfaces each in circuit with the two legs of a Wheatstone bridge in which the legs are electrically balanced, immersing that surface of the body opposite to the metal surfaces in a current conducting fluid bath, applying a pulsating D. C. voltage through the bath to the second-mentioned surface to create an electrical strain in the portion of the body located between the fluid and said surfaces, and employing a voltage change or unbalance in the bridge for identification of a below standard body.

5. The method of testing thin rubber bodies having one end closed, which comprises contacting the inner surface of the body over the area of the closed end with two adjacent electrically separated metal surfaces, electrically coupling the said metal surfaces each in circuit with two legs of a Wheatstone bridge in which the legs are electrically balanced, immersing the said closed end of the hollow body in a water bath, applying an electric potential through said water bath to the outer side of the said closed end of the body to create an electrical strain in that part of the material of the body lying between the bath and the metal surfaces, and employing a voltage change or unbalance in the bridge for the identification of a below standard film.

6. Mechanism for testing material having dielectric qualities, comprising an electric circuit including a bridge, said bridge having a pair of electronic tubes connected in parallel in the two sides thereof, the said sides of the bridge being electrically balanced, an electrically operated circuit controlling unit connected across the two sides of the bridge to be electrically operated by an unbalancing of the bridge, a pair of electrically spaced current conducting bodies adapted to contact one side of the material and each electrically connected with the grid of a tube, a current supply circuit connected at one side with the bridge circuit, and means for electrically coupling the other side of said current supply circuit with the opposite side of the material for impressing a definite electric potential thereon and the development of an electric strain in the portion of the material contacted by said bodies.

7. Mechanism for testing material having dielectric characteristics, comprising a supporting body on which the material is placed, the body including two electrically separated current conductors which are covered by the material, a receptacle containing a fluid current conductor through which fluid the material covered part of the body is moved, an electric circuit including a balanced bridge having electronic tubes therein, means for electrically coupling said current conductors with one side of the bridge and with the grids of said tubes, an electric potential supply, means connecting one side of said supply with one side of said bridge, means coupling the other side of said supply with the fluid in the receptacle, and a circuit controlling relay operatively coupled with said bridge to be energized by a voltage change therein.

8. An apparatus for testing material, comprising a tank to hold a supply of liquid, a member extending within the tank, said member being adapted to have placed thereon the material to be tested, spaced sheathings on the member, said sheathings being of a material conductive of electricity, an electrically operating device, an operating circuit for said device including a supply conductor for electrical connection with the liquid within the tank, a normally open switch in said conductor, normally spaced contacts leading to a Wheatstone bridge interposed in the circuit, a normally open relay across the bridge and closing when the circuit is unbalanced, and contacts carried by the member for engagement with the contacts of the circuit, said member closing the switch in the supply conductor after the contacts of the member have engaged the contacts in the circuit, said member releasing the switch in the supply conductor to permit the same to return to normal open adjustment before the contacts of the member leave the contacts in the circuit.

9. An apparatus for testing material, comprising a tank to hold a supply of liquid, a member extending within the tank, said member being adapted to have placed thereon the material to be tested, spaced sheathings on the member, said sheathings being of a material conductive of electricity, an electrically operating device, an operating circuit for said device including a supply conductor for electrical connection with the liquid within the tank, a normally open switch in said conductor, normally spaced contacts leading to a Wheatstone bridge interposed in the circuit, a normally open relay across the bridge and closing when the circuit is unbalanced, contacts carried by the member for engagement with the contacts of the circuit, said member closing the switch in the supply conductor after the contacts of the member have engaged the contacts in the circuit, said member releasing the switch in the supply conductor to permit the same to return to normal open adjustment before the contacts of the member leave the contacts in the circuit, and a second normally open relay interposed in the supply circuit for the bridge, said second relay closing when current flows through both of the conductors leading from the contacts in the circuit.

10. The system of testing in sequential steps different areas of a thin rubber hollow body having a closed top, comprising a mandrel adapted to move along a predetermined path and on which the body is drawn, the mandrel having a metallic hemi-spherical tip divided into equal electrically separated parts, a metallic sheath encircling the mandrel and electrically separated from the tip, and a second metallic sheath encircling the mandrel and electrically separated from the first sheath, a pair of contacts carried by the mandrel and each connected with one of said tip parts, a third contact on the mandrel connected with the first sheath and a fourth contact on the mandrel connected with the second sheath, a current conducting fluid bath through which the body is moved on the mandrel, a group of two condenser plates arranged adjacent said bath to be engaged by said pair of contacts, an electrical testing circuit including a bridge having electrically balanced legs connected with the pair of condenser plates, a group of four condenser plates adjacent said bath in which three of the four plates are electrically coupled together and engaged by the pair of contacts and by the third contact, the fourth contact engaging the fourth plate of the second-mentioned group, a second testing circuit including a bridge having electrically balanced legs, one of which legs is electrically coupled with the three coupled plates and the other one of the legs of the last-mentioned circuit being coupled with the fourth plate, a second group of four conductor plates all electrically coupled together and arranged for engagement by the four contacts, a third testing circuit including a bridge having electrically balanced legs to which the four coupled plates are electrically connected, a relay unit operatively coupled to each of said circuits to be energized upon the occurrence of a voltage change therein, an indicator circuit connected with and controlled by each relay, and an electric potential supply means coupled on one side with each circuit and electrically connected upon its other side with the fluid of said bath.

MICHAEL H. LOUGHNANE.